United States Patent [19]

Okumura et al.

[11] Patent Number: 5,306,802

[45] Date of Patent: * Apr. 26, 1994

[54] POLYCARBONATE COPOLYMER AND METHOD FOR PRODUCTION THEREOF

[75] Inventors: Ryozo Okumura; Shigeki Kuze; Noriyuki Kunishi, all of Ichihara, Japan

[73] Assignee: Idemitsu Petrochemical Co., Ltd., Tokyo, Japan

[ * ] Notice: The portion of the term of this patent subsequent to Feb. 9, 2010 has been disclaimed.

[21] Appl. No.: 31,631

[22] Filed: Mar. 15, 1993

[30] Foreign Application Priority Data

Mar. 31, 1992 [JP] Japan .................................. 4-74891

[51] Int. Cl.$^5$ .............................................. C08G 64/26
[52] U.S. Cl. ................................... 528/198; 528/171; 528/174; 528/196; 528/202; 528/204
[58] Field of Search ............... 528/198, 202, 204, 196, 528/171, 174

[56] References Cited

U.S. PATENT DOCUMENTS

| | | | |
|---|---|---|---|
| 4,831,100 | 5/1989 | Komatsu et al. | 528/198 |
| 5,185,425 | 2/1993 | Komatsu | 528/198 |

FOREIGN PATENT DOCUMENTS 699028  5/1967  Belgium .

Primary Examiner—Harold D. Anderson
Attorney, Agent, or Firm—Frishauf, Holtz, Goodman & Woodward

[57] ABSTRACT

Disclosed herein is a polycarbonate copolymer comprising repeating units respectively made of a bisphenol A and a tetrahalogenobisphenol A and having a trihalogenophenoxy group as an end group at the terminal, particularly both terminals thereof and a method for efficiently producing said polycarbonate copolymer. This polycarbonate copolymer is superior in impact resistance, flame retardance, molding thermostability and the like, is good in hydrolytic resistance, is much less liable to cause a mold rust and has high quality. Therefore, this polycarbonate copolymer will be extensively used in various industrial materials, for example as the flame retardant parts for household electric appliances, office automation apparatuses and the like.

18 Claims, No Drawings

POLYCARBONATE COPOLYMER AND METHOD FOR PRODUCTION THEREOF

BACKGROUND OF THE INVENTION

1. Field of the Invention

The present invention relates to a polycarbonate copolymer and a method for producing the same. More particularly it relates to a polycarbonate copolymer which is superior in impact resistance, flame retardance, molding thermostability and the like, is good in hydrolytic resistance, is much less liable to cause a mold rust and further has high quality and a method for efficiently producing the same.

2. Description of Related Arts

As the halogen-containing copolymerized polycarbonate having high flame retardance, for example ① a copolymer derived from tetrabromobisphenol A (TBA) and bisphenol A (BPA) (Japanese Patent Publication No. 24660/1972), ② a copolymer derived from tetrabromobisphenolsulfone (TBS) and BPA (Japanese Patent Application Laid-Open No. 123294/1976), ③ a copolymer derived from tetrabromothiodiphenol (TBTDP) and BPA (Japanese Patent Application Laid-Open No. 99226/1981) and ④ a blend of the copolymer derived from a statistical mixture of halogenated bisphenol and BPA (Japanese Patent Application Laid-Open No. 136796/1976) or the copolymer derived from thiodiphenol (TDP) and BPA and the copolymer as set forth in ① above (Japanese Patent Application Laid-Open No. 50065/1979) are known.

These copolymers contain a halogen in an amount necessary to have sufficiently high flame retardance through the copolymerization with halogenated bisphenols which are obtained by introducing halogen into the benzene nucleus of the bisphenols.

However, all of these polycarbonate copolymers have to have a comparatively high content of the halogenated bisphenols preventing a sufficiently satisfactory mechanical strength (particularly, impact resistance).

Other known examples of the halogen-containing polycarbonate copolymer are those in which a halogenated phenol is used as an end terminator (Japanese Patent Publication No. 40715/1971), but they are not sufficiently high in both flame retardance and mechanical strength.

Still other examples are the polycarbonates copolymerizing BPA, TBA and TDP to overcome the above shortcomings (Japanese Patent Application Laid-Open No. 140597/1977). Those polycarbonates are sufficiently high in the two of flame retardance and mechanical strength but not necessarily satisfactory with respect to moldability.

The study group of the present inventors have proposed a novel polycarbonate superior in flame retardance, mechanical strength and the like, in which a pentahalogenophenol is used as the end terminator and further BPA and TBA are copolymerized (Japanese Patent Application Laid-Open Nos. 79227/1989 and 79228/1989). This polycarbonate has been found to be excellent in flame retardance, mechanical strength and the like, but somewhat unsatisfactory in thermostability when the polycarbonate is molded.

In order to overcome the above problem, the study group of the present inventors have proposed a polycarbonate using a trihalogenophenol as the end terminator and copolymerizing BPA and TBA (Japanese Patent Application Laid-Open No. 200833/1991). It has been found, however, that something is missing in polycarbonates prepared by conventional polymerization techniques in connection with hydrolytic resistance and mold rust.

In view of the above problems of the related arts, the present inventors have made extensive studies with a view to developing a method for production of a polycarbonate which is superior in impact resistance, molding thermostability, color tone and the like, is of high hydrolytic resistance, is much less liable to cause mold rust and further has high quality. As the result, it has been found that the desired polycarbonate copolymer can be obtained according to a method which comprises steps of reacting bisphenol A with phosgene in the presence of an alkaline compound to react all of the phosgene in the reaction system into a polycarbonate oligomer; reacting the resultant polycarbonate oligomer with a tetrahalogenobisphenol A and a trihalogenophenol to prepare a polycarbonate copolymer oligomer; thereafter, separating the organic layer containing the resultant polycarbonate copolymer oligomer; and reacting the polycarbonate copolymer oligomer contained in the separated organic layer with bisphenol A and, if necessary, an end terminator in the presence of an alkaline compound. The resulting polycarbonate copolymer is superior in impact resistance, molding thermostability, color tone and the like, is good in hydrolytic resistance, is much less liable to cause mold rust and has high quality. The present invention has been completed on the basis of this finding.

SUMMARY OF THE INVENTION

Therefore, an object of the present invention is to provide a polycarbonate copolymer which is excellent in impact resistance, flame retardance, molding thermostability, color tone and the like, is good in hydrolytic resistance, is much less liable to cause mold rust and further is in high quality.

Another object of the present invention is to provide a polycarbonate copolymer useful as various industrial materials, for example as the flame retardant parts for household electric appliances, office automation apparatuses and the like.

The present invention provides a polycarbonate copolymer comprising a repeating unit (A) represented by the formula (I):

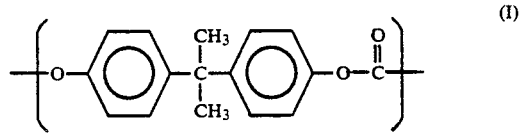

a repeating unit (B) represented by the general formula (II):

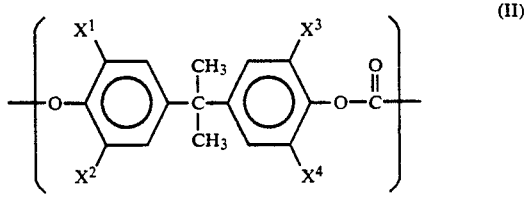

wherein $X^1$ to $X^4$ are each a halogen atom, and an end group (C) represented by the general formula (III):

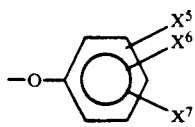

wherein $X^5$ to $X^7$ are each a halogen atom, having a viscosity-average molecular weight of 10,000 to 50,000 and a repeating unit (B) content of 1 to 10 mole % in the main chain and containing a tetrahalogenobisphenol A-derived chloroformate group and a trihalogenophenol-derived chloroformate group each remaining within said copolymer in a total amount equivalent to 0.05 mole % or less based on bisphenols from which the repeating units (A) and (B) are made.

The present invention also provides a method for producing the above polycarbonate copolymer, which comprises steps of reacting bisphenol A with phosgene in the presence of an alkaline compound in a reaction medium comprising water and an organic solvent to react substantially all of the phosgene in the reaction system into a polycarbonate oligomer; reacting the resultant polycarbonate oligomer with a tetrahalogenobisphenol A and a trihalogenophenol each other to prepare a polycarbonate copolymer oligomer; thereafter, separating the organic layer containing the resultant polycarbonate copolymer oligomer; and reacting the polycarbonate copolymer oligomer contained in the separated organic layer with bisphenol A and if necessary a trihalogenophenol in the presence of an alkaline compound.

DESCRIPTION OF THE PREFERRED EMBODIMENTS

The polycarbonate copolymer of the present invention comprises the repeating unit (A) represented by the formula (I) and the repeating unit (B) represented by the general formula (II).

In the general formula (II), $X^1$ to $X^4$ are each a halogen atom such as bromine, chlorine or fluorine. They may be the same or different but ordinarily are often the same.

In the polycarbonate copolymer of the present invention, an end group (C) represented by the general formula (III), i.e. a trihalogenophenoxy group is linked to the end, particularly both ends of the molecule. As in the case with the above $X^1$ to $X^4$, $X^5$ to $X^7$ within the end group (C) represented by the general formula (III) are each a halogen atom such as bromine, chlorine or fluorine.

$X^1$ to $X^4$ in the repeating unit (B) represented by the general formula (II) may be the same as or different from $X^5$ to $X^7$ within the end group (C) represented by the general formula (III).

The mole fraction of the repeating unit (A) and the repeating unit (B) in the polycarbonate copolymer of the present invention should be controlled in order that the repeating unit (B) content in the main chain is 1 to 10 mole %, preferably 2 to 6 mole %. If the repeating unit (B) content in the main chain is less than 1 mole %, flame retardance is poor. On the other hand, if it is in excess of 10 mole %, the mechanical strength such as impact resistance is undesirably low.

In connection with the degree of polymerization of the polycarbonate copolymer of the present invention, the viscosity-average molecular weight is suitably in a range of 10,000 to 50,000. If the viscosity-average molecular weight is less than 10,000, the mechanical strength such as impact resistance is not satisfactorily high. On the other hand, if it is in excess of 50,000, fluidity is undesirably low.

The polycarbonate copolymer of the present invention contains a tetrahalogenobisphenol A-derived chloroformate group and a trihalogenophenol-derived chloroformate group each remaining in said copolymer in a total amount equivalent to 0.05 mole % or less based on the bisphenols. If it is in excess of 0.05 mole %, the resultant product undesirably has insufficiently low hydrolytic resistance, is liable to cause rust on a mold used to mold it and does not have desired high quality.

Furthermore, the polycarbonate copolymer of the present invention has a structure comprising the above repeating units (A) and (B), linking the trihalogenophenoxy group as the end group (C) to the terminal (preferably both terminals) thereof. It may be a random copolymer, a block copolymer, an alternate copolymer or various other copolymers comprising these repeating units (A) and (B).

Moreover, this polycarbonate copolymer may contain a small amount of a repeating unit or repeating units other than the repeating units (A) and (B) in the molecular chain thereof. Examples of the third constituent comonomer of such other repeating units are a bisphenolsulfone (BPS), a thiodiphenol (TDP) or a trishydroxyphenylethane as the branching agent. Their content (mole fraction) is 0 to 20 mole %, preferably 0 to 10 mole % based on the total amount of BPA and the tetrahalogenobisphenol A. If their content is in excess of 20 mole %, the mechanical strength is undesirably poor.

The polycarbonate copolymer of the present invention can be efficiently produced according to a method which comprises at first reacting bisphenol A represented by the general formula (IV):

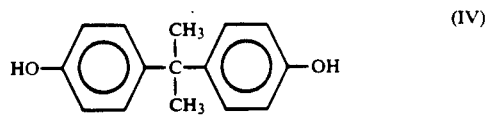

with phosgene in a solvent such as methylene chloride and, if necessary, in the presence of a known acid acceptor and molecular weight modifier to react substantially all of the phosgene in the reaction system into a polycarbonate oligomer (hereinafter referred to as PC oligomer). This PC oligomer has the repeating unit (A) represented by the formula (I) as the result of the reaction between the bisphenol A and the phosgene in the above polycondensation.

Specifically, the PC oligomer having the repeating unit (A) represented by the general formula (I) is produced ordinarily by mixing an aqueous alkaline solution of bisphenol A with a solvent such as methylene chloride, chlorobenzene, pyridine, chloroform or carbon tetrachloride and, if necessary, a catalyst such as triethylamine, trimethylbenzyl ammonium chloride or the like in a predetermined ratio, stirring the resultant mixture and blowing phosgene thereinto to proceed with the interfacial polycondensation. Since the reaction is exothermic, it is preferred to cool the reaction system with water or ice. Furthermore, since the reaction system becomes acidic as the reaction proceeds, it is preferred that the pH be maintained at 10 or more by adding an alkaline compound while measuring with a pH meter.

Next, after substantially all of the phosgene in the reaction system is reacted, the PC oligomer having the repeating unit (A) represented by the formula (I) is mixed with an aqueous alkaline solution of a tetrahalogenobisphenol A represented by the general formula (V):

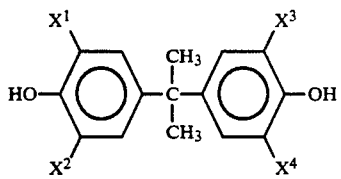

wherein $X^1$ to $X^4$ are the same as described above, an aqueous alkaline solution of a trihalogenophenol represented by the general formula (VI):

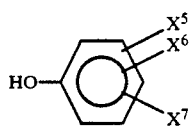

wherein $X^5$ to $X^7$ are the same as described above and a catalyst such as triethylamine, trimethylbenzyl ammonium chloride or the like in a predetermined ratio. The resultant mixture is stirred and polymerized into a polycarbonate copolymer oligomer (hereinafter referred to as PC copolymer oligomer). The PC copolymer oligomer contains the repeating unit (B) represented by the general formula (II) as the result of the reaction with the tetrahalogenobisphenol A and the end group (C) represented by the general formula (III) as the result of the reaction with the trihalogenophenol.

The tetrahalogenobisphenol A represented by the above general formula (V) is, for example a tetrabromobisphenol A, a tetrachlorobisphenol A, a tetrafluorobisphenol A or the like.

The trihalogenophenol represented by the above general formula (VI) is, for example a tribromophenol, a trichlorophenol, a trifluorophenol or the like.

Furthermore, replacing a part of trihalogenophenol (50 mole % or less), a monohydric phenol such as p-tert-butylphenol, phenol or the like can be added to the reaction system. As comonomers, a branching agent such as trishydroxyphenylethane or said BPS, TDP and the like can be also added to the reaction system. As the aqueous alkaline solution, an aqueous sodium hydroxide solution, an aqueous potassium hydroxide solution, an aqueous sodium carbonate solution and the like can be used.

After the reaction is over, the so obtained reaction mixture is subjected to the phase separation between an aqueous layer an organic layer containing the above PC copolymer oligomer. On allowing the reaction mixture to stand or by the use of a centrifuge, the aqueous layer is separated from the organic layer containing the above PC copolymer oligomer, and the organic layer containing the above PC copolymer oligomer is withdrawn.

The PC copolymer oligomer contained in the separated organic layer is mixed with the aqueous alkaline solution of said bisphenol A and the catalyst such as triethylamine, trimethylbenzyl ammonium chloride or the like in the predetermined ratio. The resultant mixture is stirred, the polymerization is completed and then the polycarbonate copolymer of the present invention (hereinafter referred to as PC copolymer) is obtained.

The PC copolymer of the present invention can also be obtained according to another method which comprises steps of mixing the PC copolymer oligomer contained in the organic layer with the aqueous alkaline solution of said bisphenol A, the aqueous alkaline solution of said trihalogenophenol and the catalyst such as triethylamine, trimethylbenzyl ammonium chloride or the like in the predetermined ratio, stirring the resultant mixture and comleting the polymerization.

In the PC copolymer obtained by the above polycondensation, the repeating unit (A) represented by the formula (I) is derived from the bisphenol A of said formula (IV), the repeating unit (B) represented by the general formula (II) is derived from the tetrahalogenobisphenol A of said general formula (V) and the end group (C) represented by the general formula (III) is derived from the trihalogenophenol of said general formula (VI).

Thus, the ratio of the amount of said bisphenol A to the amount of tetrahalogenobisphenol A is appropriately determined depending upon the mole fraction of the repeating units (A) and (B) or the content of the halogen atoms in the polycarbonate copolymer to be produced.

On the other hand, the amounts of trihalogenophenol and phosgene being introduced specify the degree of polymerization respectively of the repeating units (A) and (B) and further the degree of polymerization and the molecular weight of the PC copolymer. Therefore, their amounts are determined appropriately depending upon the purpose of use. In blowing phosgene, the blowing rate of the phosgene is controlled appropriately so as to make the total amount blown at the end of the reaction equal to the total feed amount necessary for the reaction.

On pouring the resultant reaction product to a large amount of a precipitating agent such as methanol, the PC copolymer is precipitated. The precipitate is washed and dried by a conventional procedure and the PC copolymer of the present invention in the form of a white powder is obtained.

In the prevent invention, the phosgene can be replaced by various carbonate-forming derivatives such as bromophosgene, diphenyl carbonate, di-p-tolyl carbonate, phenyl-p-tolyl carbonate, di-p-chlorophenyl carbonate and dinaphthyl carbonate.

As described above, the PC copolymer of the present invention has the viscosity-average molecular weight of 10,000 to 50,000, preferably 13,000 to 50,000. The viscosity-average molecular weight can be adjusted to this range by choosing a proper amount of a molecular weight modifier such as trihalogenophenol. Ordinarily, the amount of the molecular weight modifier is in a ratio of 0.01 to 0.1 mole based on the amount of the bisphenols from which the main chain is made.

Furthermore, in the present invention, when BPA, the aqueous alkaline solutions and the catalysts such as triethylamine are added to the PC copolymer oligomer to proceed the interfacial polycondensation and obtain the desired polycarbonate copolymer, the ratio of the amount of catalyst to the amount of bisphenols is 0.0005 to 0.03 (mole/mole).

Moreover, when BPA, the alkaline solutions and the catalysts such as triethylamine are added to the PC copolymer oligomer to proceed the interfacial polycondensation and obtain the PC copolymer, the ratio of the amount of the alkaline compound to the amount of bisphenol is 0.1 to 5.0 (mole/mole).

As described above, the polycarbonate copolymer of the present invention is superior in impact resistance, flame retardance, molding thermostability and the like, is good in hydrolytic resistance, is much less liable to cause the mold rust and further have high quality.

Thus the polycarbonate copolymer of the present invention will find wide and effective application in various industrial materials, for example as a flame retardant part in household electric appliances, office automation apparatuses and the like.

The present invention will be described in greater detail with reference to the following examples and comparative examples.

Meanwhile, in the examples and comparative examples, various components were mixed according to the ratios shown in Table 1:

TABLE 1

| | On producing PC oligomer | Aqueous alkaline solutions added on producing PC copolymer oligomer | | | |
|---|---|---|---|---|---|
| | Amount of BPA (g) | Amount of TBA (g) | Amount of TBP (g) | NaOH (g) | Water (l) |
| Preparation Example 1 | 2275 | 250 | 150 | 78.6 | 1.35 |
| Preparation Example 2 | 2275 | 470 | 220 | 137.0 | 1.35 |
| Preparation Example 3 | 2275 | 135 | 160 | 56.1 | 1.35 |
| Preparation Example 4 | 2275 | 160 | 330 | 90.8 | 1.35 |
| Preparation Example 5 | 2275 | 320 | 65 | 78.6 | 1.35 |
| Comparative Example 1 | 2275 | 250 | 150 | 78.6 | 1.35 |
| Comparative Example 2 | 2275 | 250 | 150 | 78.6 | 1.35 |
| Comparative Example 3 | 2275 | 250 | 150 | 78.6 | 1.35 |
| Comparative Example 4 | 2275 | 810 | 450 | 248.4 | 2.43 |
| Comparative Example 5 | 2275 | 0 | 40 | 6.9 | 1.35 |

| | Aqueous alkaline solutions added on producing PC copolymer | | | Conversion of TBA after completion of the reaction (%) |
|---|---|---|---|---|
| | Amount of BPA (g) | NaOH (g) | Water (l) | |
| Preparation Example 1 | 457 | 267 | 3.42 | 99.9≦ |
| Preparation Example 2 | 457 | 267 | 3.42 | 99.9≦ |
| Preparation Example 3 | 457 | 267 | 3.42 | 99.9≦ |
| Preparation Example 4 | 457 | 267 | 3.42 | 99.9≦ |
| Preparation Example 5 | 457 | 267 | 3.42 | 99.9≦ |
| Comparative Example 1 | 457 | 267 | 3.42 | 99.9≦ |
| Comparative Example 2 | 457 | 267 | 3.42 | 99.9≦ |
| Comparative Example 3 | 457 | 267 | 3.42 | 85 |
| Comparative Example 4 | 457 | 267 | 3.42 | 99.9≦ |
| Comparative Example 5 | 457 | 267 | 3.42 | 99.9≦ |

EXAMPLE 1

① Preparation of the PC oligomer 2,275 g of bisphenol A (BPA), 8,250 ml of methylene chloride and 14 liters of a 2.0N aqueous sodium hydroxide solution were placed on a 50-liter vessel with stirrer and the resultant mixture was stirred. Phosgene was blown thereinto at a flow rate of 0.2 mole/min for 70 minutes while cooling to carry out the reaction and produce a reaction mixture containing the PC oligomer.

Then, stirring was continued for another 30 minutes after the blowing of phosgene was terminated. The measurement with the gas chromatography resulted in a finding that the free phosgene was not present in the reaction mixture.

② Preparation of the PC copolymer oligomer

While the above reaction mixture was stirred continuously, 1.8 liters of an aqueous sodium hydroxide solution of tetrabromobisphenol A (TBA) and tribromophenol (TBP) [TBA 250 g (0.460 mole), TBP 150 g (0.453 mole), sodium hydroxide 78.6 g (1.96 mole) and water 1.35 liters] and 1.8 ml (0.013 mole) of triethylamine were added thereto. The resultant solution was stirred at 500 rpm for 60 minutes to carry out the reaction and produce the reaction mixture containing the PC copolymer oligomer.

③ Separation of the organic layer

After the above reaction was over, stirring was discontinued. On allowing the reaction mixture to stand for 30 minutes, the organic layer and the aqueous layer were separated and the lower organic layer (a methylene chloride solution of PC copolymer oligomer) was withdrawn.

The concentration of PC copolymer oligomer was 400 g/liter and the ratio of the chloroformate content was 0.50 normal in this organic layer.

④ Preparation of the PC copolymer

The organic layer containing the PC copolymer oligomer was again placed in a 50-liter vessel equipped with stirrer. 3.9 liters of an aqueous sodium hydroxide solution of BPA [BPA 457 g (2.0 mole), sodium hydroxide 267 g (6.68 mole) and water 3.42 liters] and 6.1 liters of methylene chloride were added thereto and the resultant mixture was stirred for 60 minutes to carry out the reaction.

The so obtained reaction product was separated by allowing it to stand, and the methylene chloride solution of PC copolymer was withdrawn. The solution was washed with water, acid (0.1N hydrochloric acid) and water in this order.

Upon removal of the methylene chloride at 40° C. under reduced pressure, a white powder (PC copolymer) was obtained. This powder was dried at 120° C. for one day and night, melted and pelletized by the use of an extruder. The glass transition temperature (Tg) of the pellet was 153° C. The viscosity-average molecular weight was 24,300. The TBA [repeating unit (B)] content in the main chain of this PC copolymer as determined by NMR was 3.7 mole %.

The pellets were injection molded at a temperature of 300° C. and an injection pressure of 55 kg/cm² by the use of an injection molding machine to produce a test piece.

The bromine content of the so obtained pellets was 6.6% by weight. Meanwhile, the bromine content was determined by subjecting the sample to perfect combustion in a bomb and titrating the bromine with an aqueous silver nitrate solution.

EXAMPLES 2 TO 5

The procedure of Example 1 was repeated wherein the amounts of TBA, TBP and NaOH in the step for preparing the PC copolymer oligomer were changed as shown in Table 1.

COMPARATIVE EXAMPLE 1

The procedure of Example 1 was repeated wherein TBA and TBP were added before the phosgene was blown.

COMPARATIVE EXAMPLE 2

The procedure of Example 1 was repeated wherein TBA and TBP were added immediately after the phosgene was blown.

COMPARATIVE EXAMPLE 3

① Preparation of the PC oligomer of bisphenol A 2275 g of bisphenol A (BPA), 8250 ml of methylene chloride and 14 liters of the 2.0N aqueous sodium hydroxide solution were placed in a 2-liter flask with stirrer, and then the resultant mixture was stirred. Phosgene was blown thereinto for 70 minutes while cooling on a water bath. On allowing the obtained reaction mixture to stand at room temperature, a methylene chloride solution of an oligomer was separated as the under layer. In this oligomer solution, the oligomer concentration was 320 g/liter, the number average molecular weight was 850 and the concentration of the chloroformate group was 0.7 mole/liter.

② Preparation of the PC copolymer 10 liters of the PC oligomer prepared in ① above, 1.8 milliliters of an aqueous sodium hydroxide solution of tetrabromobisphenol A (TBA) and tribromophenol (TBP) [TBA 250 g (0.460 mole), TBP 150 g (0.453 mole), sodium hydroxide 78.6 g (1.96 mole) and water 1.35 liters] and 1.8 milliliters (0.013 mole) of triethylamine were placed in a 50-liter vessel equipped with stirrer and then the resultant mixture was stirred at 500 rpm. After 60 minutes, 3.9 liters of the aqueous sodium hydroxide solution of BPA [BPA 457 g (2.00 mole), sodium hydroxide 267 g (6.68 mole) and water 3.42 liters] and 6.1 liters of methylene chloride were added and then the resultant mixture was stirred.

After 60 minutes of stirring, the resultant reaction product was separated into an aqueous layer and a methylene chloride layer containing the formed copolymer.

This methylene chloride layer was washed with water, acid (0.1N hydrochloric acid) and water in this order. Upon removal of methylene chloride from this methylene chloride layer at 40° C. under reduced pressure, a white powder (copolymer) was obtained. This white powder was further dried at 120° C. for one day and night, melted and pelletized by the use of an extruder. The glass transition temperature (Tg) of this pellet was 152.6° C., the viscosity-average molecular weight was 23,900 and the molecular weight distribution as determined by the gel permeation chromatography was such a distribution that had a single peak at the above value. The TBA content [the repeating unit (B)] in the main chain of this copolymer as determined by NMR was 3.1 mole %.

COMPARATIVE EXAMPLES 4 to 5

The procedure of Example 1 was repeated wherein the amounts of TBA, TBP, NaOH and water in the step for preparing the PC copolymer oligomer were changed.

The pellets and test pieces obtained in the examples and comparative examples were analyzed for their performance; the flow value, the mold rust and the chloroformate groups remaining in the PC copolymer were determined by the use of the pellets and the Izod impact strength, the flame retardance, the YI value and the hydrolytic resistance were examined with the test pieces. The results of the analysis of performance are shown in Table 2.

TABLE 2

|  | Amount of TBA (mole %) | Mv | Flow value (ml/sec) | Mold rust[*1] | Chloroformate group[*2] |
|---|---|---|---|---|---|
| Preparation Example 1 | 3.7 | 24,300 | 2.4 | 2 | 0.01> |
| Preparation Example 2 | 7.0 | 19,800 | 4.3 | 2 | 0.01> |
| Preparation Example 3 | 2.0 | 25,500 | 2.7 | 2 | 0.01> |
| Preparation Example 4 | 2.4 | 16,300 | 14.0 | 2 | 0.01> |
| Preparation Example 5 | 4.7 | 43,000 | 0.12 | 2 | 0.01> |
| Comparative Example 1 | 3.7 | 21,000 | 3.0 | 5 | 0.6 |
| Comparative Example 2 | 3.7 | 22,800 | 2.7 | 5 | 0.1 |
| Comparative Example 3 | 3.1 | 23,000 | 2.4 | 4 | 0.08 |
| Comparative Example 4 | 12.0 | 9,000 | 32.0 | 2 | 0.01> |
| Comparative Example 5 | 0 | 60,000 | 0.07 | 2 | 0.01> |

|  | Izod impact strength | Flame retardance | YI Value | Hydrolytic resistance |
|---|---|---|---|---|
| Preparation Example 1 | 90 | V-0 | 4 | Transparent |
| Preparation Example 2 | 78 | V-0 | 3 | Transparent |
| Preparation Example 3 | 95 | V-0 | 4 | Transparent |
| Preparation Example 4 | 60 | V-0 | 2 | Transparent |
| Preparation Example 5 | 98 | V-0 | 4 | Transparent |
| Comparative Example 1 | 75 | V-0 | 13 | Opaque |
| Comparative Example 2 | 77 | V-0 | 12 | Opaque |
| Comparative Example 3 | 88 | V-0 | 8 | Opaque |
| Comparative Example 4 | 2 | V-0 | 5 | Transparent |
| Comparative Example 5 | 97 | V-2 | 3 | Transparent |

[*1]Mold is more susceptible to the rust as the number is greater.
[*2]% by mole/bisphenols
Flow value: × $10^{-2}$
Izod impact strength: kg-cm/cm The viscosity-average molecular weight (Mv) was determined and the performance was analyzed under the following conditions:

1) The viscosity-average molecular weight (Mv):

Determined by calculating from a viscosity of a methylene chloride solution as measured at 20° C. by the use of a Ubbellohde viscometer.

2) Measurement of the flow value:

Measured according to JIS-K-7210 (load 160 kg/cm$^2$)

3) Mold rust:

The pellets were short shot molded consisting of 120 shots and 24 hours thereafter the condition of rust of the mold was assessed in 5 categories with eye.

4) The chloroformate groups remaining in the polymer:

Two grams of the polymer were dissolved in 20 ml of methylene chloride, 0.6 ml of pyridine and 1 ml of methanol were added thereto and the resultant mixture was stirred for 30 minutes to methylate a chloroformate group. The mole fraction of TBA (TBP) methyl carbonate was determined by $^1$H-NMR.

5) The Izode impact strength:

Measured according to JIS-K-7110 using a test piece having a thickness of ⅛ inch.

6) Flame retardance:

Flame Retardance Test UL-94

Measured by a vertical flaming test according to Underwriter's Laboratory Subject 94 using a test piece of 1/16 inch in thickness.

7) YI value (Molding thermostability):

The pellets were maintained within an injection molding machine at 300° C. for 30 minutes and then a test piece was prepared. The yellowness index (YI) of the resultant test piece was measured by the use of a transmitted illumination type photometer.

8) Hydrolytic resistance:

A test piece was maintained within a steam tester at 120° C. for 48 hours and then the degree of opacity of the test piece was determined with eye.

What is claimed is:

1. A polycarbonate copolymer comprising in a main chain a repeating unit (A) represented by the formula (I):

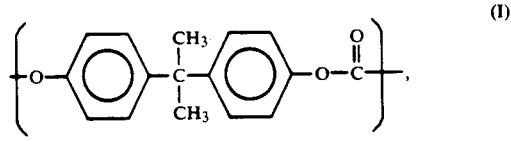

repeating unit (B) represented by the formula (II):

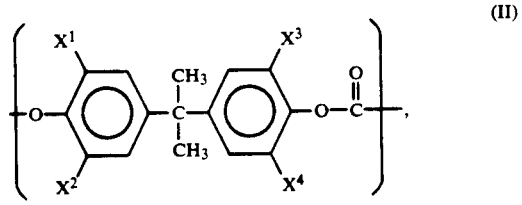

wherein $X^1$ to $X^4$ are each a halogen atom, and an end group (C) represented by the formula (III):

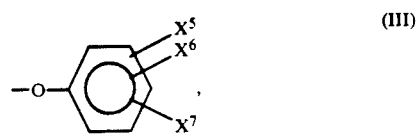

wherein $X^5$ to $X^7$ are each a halogen atom, said polycarbonate copolymer having a viscosity-average molecular weight of 10,000 to 50,000, said repeating unit (B) being contained in an amount of 1 to 10 mole % in the main chain and containing a tetrahalogenobisphenol A-derived chloroformate group and a trihalogenophenol-derived chloroformate group, each contained within said copolymer in a total amount of not more than 0.05 mole % based on said bisphenols from which the repeating units (A) and (B) are formed.

2. The polycarbonate copolymer according to claim 1 having a repeating unit (B) content of 2 to 6 mole % in the main chain.

3. The polycarbonate copolymer according to claim 1 having a viscosity-average molecular weight of 13,000 to 50,000.

4. The polycarbonate copolymer according to claim 2 wherein $X^1$ to $X^7$ are each a halogen atom selected from the group consisting of bromine, chlorine and fluorine.

5. The polycarbonate copolymer according to claim 4 having a viscosity average molecular weight of 13,000 to 50,000.

6. The polycarbonate copolymer according to claim 5 which further comprises a repeating unit from a co-monomer selected from the group consisting of bis-phenolsulfone, thiodiphenol and trishydroxyphenylethane in an amount up to 20 mole %.

7. The polycarbonate copolymer according to claim 5 wherein there are two of said end groups (C).

8. A method for producing the polycarbonate copolymer as set forth in claim 1 which comprises (a) reacting bisphenol A with a carbonate forming compound selected from the group consisting of phosgene, bromophosgene, diphenyl carbonate, di-p-polycarbonate, phenyl-p-tolyl carbonate, di-p-chlorophenyl carbonate and dinaphthyl carbonate in the presence of an alkaline compound in a reaction medium comprising water and an organic solvent to react substantially all of the carbonate forming compound in the resultant reaction system into a polycarbonate oligomer; (b) reacting the resultant polycarbonate oligomer with a terahalogenobisphenol A and a phenol compound comprising trihalogenophenol to prepare a polycarbonate copolymer oligomer; (c) separating the organic layer containing the resultant polycarbonate copolymer oligomer; and (d) reacting the polycarbonate copolymer oligomer contained in the separated organic layer with bisphenol A in the presence of an alkaline compound.

9. The method according to claim 8 wherein the polycarbonate copolymer oligomer contained in the separated organic layer is reacted with bisphenol A and a trihalogenophenol in the presence of an alkaline compound.

10. The method according to claim 8, wherein in step (a), the polycarbonate oligomer is mixed with an aqueous alkaline solution of bisphenol A, a solvent selected from the group consisting of methylene chloride, chlorobenzene, chloroform and carbon tetrachloride, and a catalyst selected from the group consisting of triethylamine and trimethylbenzyl ammonium chloride.

11. The method according to claim 8 wherein in step (d), the polycarbonate copolymer oligomer is mixed with an aqueous alkaline solution of bisphenol A and a catalyst selected from the group consisting of triethylamine and trimethylbenzyl ammonium chloride.

12. The method according to claim 8 wherein the viscosity-average molecular weight of the polycarbonate copolymer is adjusted to 10,000 to 50,000 with a molecular weight modifier in a ratio of 0.01 to 0.1 mole based on the amount of the bisphenols from which the main chain is made.

13. The method according to claim 8 wherein a catalyst selected from the group consisting of triethylamine and trimethylbenzyl ammonium chloride is present in a ratio of 0.0005 to 0.03 based on the amount of bisphenol A on a mole by mole basis to form the polycarbonate copolymer by an interfacial polycondensation by adding an aqueous alkaline solution and said catalyst to the polycarbonate copolymer oligomer.

14. The method according to claim 8 wherein the alkaline compound is present in a ratio of 0.1 to 5.0 based on the amount of the bisphenols on a mole by mole basis to form a polycarbonate copolymer by an interfacial polycondensation by adding an aqueous alkaline solution and a catalyst selected from the group consisting of triethylamine and trimethylbenzyl ammonium chloride to the polycarbonate copolymer oligomer.

15. The method according to claim 8 wherein the carbonate forming compound is phosgene; the tetrahalogenobisphenol A is selected from the group consisting of tetrabromobisphenol A, tetrachlorobisphenol A and tetrafluorobisphenol A; and the trihalogenophenol is selected from the group consisting of tribromophenol, trichlorophenol and trifluorophenol.

16. The method according to claim 15 wherein in step (a), bisphenol A is reacted with an aqueous alkaline solution selected from the group consisting of an aqueous sodium hydroxide solution, an aqueous potassium hydroxide solution and an aqueous sodium carbonate solution.

17. The method according to claim 16 wherein in step (d) the polycarbonate copolymer oligomer is mixed with an aqueous alkaline solution of bisphenol A and a catalyst selected from the group consisting of triethylamine and trimethylbenzyl ammonium chloride; wherein the molar amount of the catalyst to the molar amount of the bisphenol A is in a ratio of 0.0005 to 0.03.

18. The method according to claim 17 wherein in step (b) 50 mole % or less of the phenol compound is phenol or p-tert-butylphenol.

* * * * *